(12) United States Patent
Smith et al.

(10) Patent No.: US 6,255,973 B1
(45) Date of Patent: Jul. 3, 2001

(54) ADDRESS SELECTION CIRCUITRY AND METHOD USING SINGLE ANALOG INPUT LINE

(75) Inventors: Matt Smith, Limerick; David Hanrahan, Waterford, both of (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/383,447

(22) Filed: Aug. 26, 1999

(51) Int. Cl.[7] .............................. H03M 1/00; H03M 1/06
(52) U.S. Cl. ............................ 341/141; 341/118
(58) Field of Search ................... 341/141, 118, 341/120, 110, 139; 700/3

(56) References Cited

U.S. PATENT DOCUMENTS 5,784,020 * 7/1998 Inoue .................................. 341/141

* cited by examiner

Primary Examiner—Patrick Wamsley

(74) Attorney, Agent, or Firm—Samuels, Gauthier & Stevens LLP

(57) ABSTRACT

A system for a providing addresses to each one of a plurality of addressable integrated circuits. The system includes a plurality of address select circuits, each one thereof being coupled to a corresponding one of a corresponding plurality of addressable integrated circuit. Each one of such integrated circuits has an address select pin adapted to receive a signal from the corresponding one of the address select circuits. The signal is indicative of an address for such one of the plurality of addressable integrated circuits. Each one of such address circuit includes a signal source connected to the pin and a circuit for coding such signal source into a selected one of more than three predetermined signal levels. The integrated circuit includes a converter for converting such selected one of the signal levels into a address signal for such one of the integrated circuits during an initial address select mode and for providing conversion of a second signal in the integrated circuit for use by such integrated circuit in processing the second signal fed to such integrated circuit during a subsequent normal operating mode. In one embodiment the converter is an analog to digital converter. The other signal is indicative of temperature. A register is provided for storing the address signal for such one of the integrated circuits.

14 Claims, 3 Drawing Sheets

ADDRESS SELECTION CIRCUITRY AND METHOD USING SINGLE ANALOG INPUT LINE

BACKGROUND OF THE INVENTION

This invention relates generally to address selection circuitry and methods and more particularly to circuitry and methods adapted to provide an address for each one of a plurality of addressable integrated circuits.

As is known in the art, many systems use addressable integrated circuits. One such system is a so-called System Management (SM) bus system and is shown in FIG. 1. Here, the SM bus has two lines; line SDA is for data and addresses and line SCL is for clock pulses. As shown, each one of the addressable Application Specific Integrated Circuits (ASICS) used in the SM system have a single pin ADDR to receive the address to be selected, and stored in, such one of the ASICs. The single pin ADDR allows the designer to tie the pin to one of three signal levels, i.e., a high voltage signal level, a low voltage signal level, or an open circuit, or "floating" voltage signal level. More particularly, each one of the levels corresponds to a different two bit word used in the address of the ASIC. Still more particularly, during an initial address select mode, the signal level on the ADDR pin is converted into one of three possible portions of the address for the ASIC. That is, a slave address register (FIG. 2) is provided in each ASIC. Each register stores, for example, a seven bit address. The five most significant bits are previously stored in the address register. However, the last two bits are derived from the voltage level on the ADDR pin. Thus, here for example, at power-on the level on the ADDR pin is passed through a decoder. Here, for example, if the level on the ADDR pin is high, the decoder produces a two bit word 00. It the level on the ADDR pin is low, the decoder produces a two bit word 11. Finally, if there is an open circuit on the ADDR pin, the decoder produces a two bit word 01. At power-on the two bit word produced by the decoder is stored as the two least significant bits in the slave address register. The contents of the slave address register are then used as the address for the ASIC during the normal mode. That is, during the normal operating mode, the here seven bit address of the ASIC, which is stored in the slave address decoder, is fed to a serial interface (which includes a comparator) of the ASIC. Thus, if the address on the SDA line is the same as the address stored in the address register, comparator indicates to the ASIC that it is the ASIC being addressed.

While such an address select system is useful in some applications if more than three addresses are required additional ADDR pins would be needed for each ASIC to accommodate the three level signal (i.e., a high level voltage, a low level voltage, or an open circuit condition). That is, one of these three conditions would be placed on a corresponding one of the additional ADDR pins of the ASIC.

SUMMARY OF THE INVENTION

In accordance with the invention, an address select circuit for an addressable integrated circuit is provided. The address select circuit includes a signal source and a circuit for coding such signal source into a corresponding signal at a pin of the integrated circuit. The signal at the pin has a selected one of more than three predetermined signal levels. The integrated circuit includes a converter, having an input adapted for coupling to the pin, for converting the coded signal level into a address signal for such integrated circuit. The integrated circuit includes a register for storing the address signal for such integrated circuit.

With such circuitry the single pin of the integrated circuit can be fed with more than three signal levels using only a single ADDR pin, each level corresponding to a selected address for the integrated circuit. The converter of the integrated circuit converts the signal level into the desired address for the integrated circuit for use during a subsequent normal operating mode. The converter may be an analog to digital converter already available in the integrated circuit for processing other analog signals, such as, for example, the temperature of the integrated circuit or an external temperature.

In accordance with one embodiment of the invention, an address select circuit is provided for providing an address for an integrated circuit. The address select circuit includes a signal source. A circuit is provided for coding such signal source into a corresponding signal at a pin of the integrated circuit, such signal having a selected one of more than three predetermined signal levels. The integrated circuit includes a converter for converting such selected one of the signal levels into a address signal for such integrated circuit during an initial address select mode and for providing conversion of a second signal in the integrated circuit for use by such integrated circuit in processing the second signal during a subsequent normal operating mode.

In one embodiment of the invention, the converter is an analog to digital converter.

In one embodiment of the invention, the second signal is indicative of temperature.

In accordance with still another embodiment of the invention, a system is provided having a plurality of address select circuits, each one thereof being coupled to a corresponding one of a corresponding plurality of addressable integrated circuit. Each one of such integrated circuits has an address select pin adapted to receive an address select signal from the corresponding one of the address select circuits. The address select signal is indicative of an address for such one of the plurality of addressable integrated circuits. Each one of such address circuits includes a signal source and a circuit for coding such signal source into a corresponding signal at a pin of the integrated circuit. The signal has a selected one of more than three predetermined signal levels. The integrated circuit includes a converter for converting such selected one of the signal levels into a address signal for such one of the integrated circuits. The integrated circuit also includes a register for storing the address signal for such one of the integrated circuits.

In accordance with still another embodiment of the invention, a method is for providing an address for an addressable integrated circuit. The method includes providing a signal source and coding such signal source into a corresponding signal at a pin of the integrated circuit, such signal being coded with a selected one of more than three predetermined signal levels. The selected one of the signal levels is converted into a address signal for such integrated circuit. The address signal for such integrated circuit is stored in the integrated circuit.

In accordance with yet another embodiment of the invention, a method is provided wherein a plurality of address select circuits are coupled to a corresponding one of a corresponding plurality of addressable integrated circuit. Each one of such integrated circuits has an address select pin adapted to receive an address select signal from the corresponding one of the address select circuits. The address select signal is indicative of an address for such one of the plurality of addressable integrated circuits. The method includes providing a signal source and coding such signal source into a corresponding signal at a pin of the integrated circuit. The signal is coded with a selected one of more than three predetermined signal levels. The selected one of the signal levels is converted into a address signal for such one of the integrated circuits. The address signal for such one of the integrated circuits is stored in the integrated circuit.

In accordance with one embodiment, converting such selected one of the signal levels into a address signal for such one of the integrated circuits takes place during an initial address select mode and a second signal in the integrated circuit is converted for use by such integrated circuit in processing the second signal during a subsequent normal operating mode.

BRIEF DESCRIPTION OF THE DRAWING

These and other features of the invention, as well as the invention itself, will become more readily apparent from the following detailed description when read together with the accompanying drawings, in which.

DESCRIPTION OF THE PREFERRED EMBODIMENTS

Figure 1:
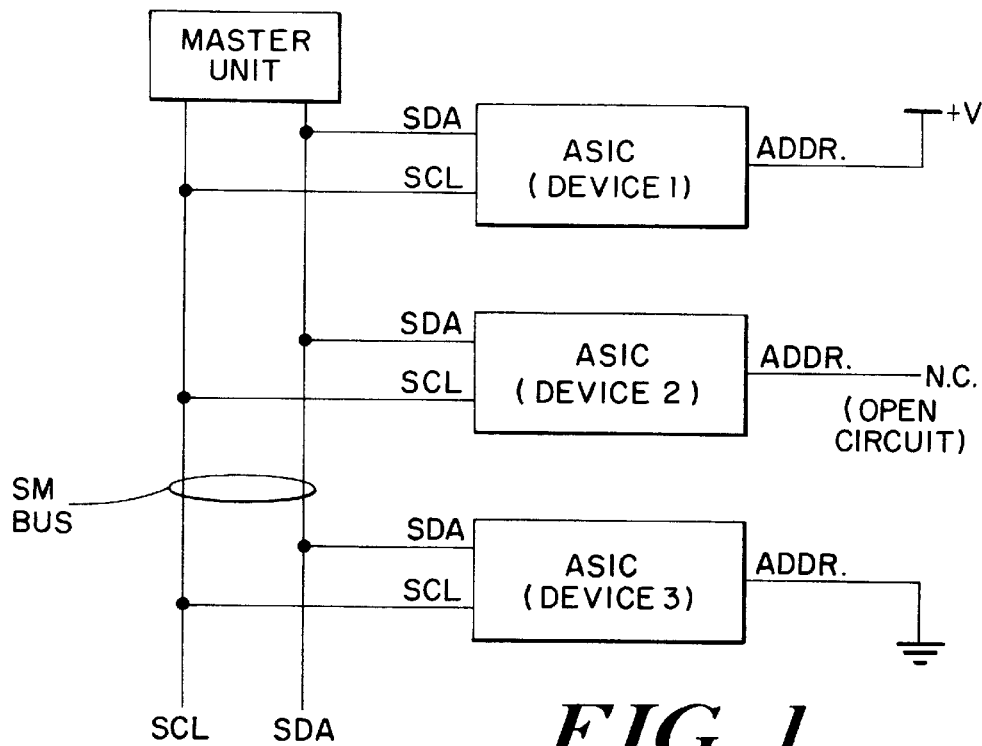
FIG. 1 is system having a plurality of interconnected addressable integrated circuits together with circuitry for providing a selected one of a plurality of addresses for a corresponding one of the integrated circuits during an address select mode in accordance with the PRIOR ART.
Figure 2:
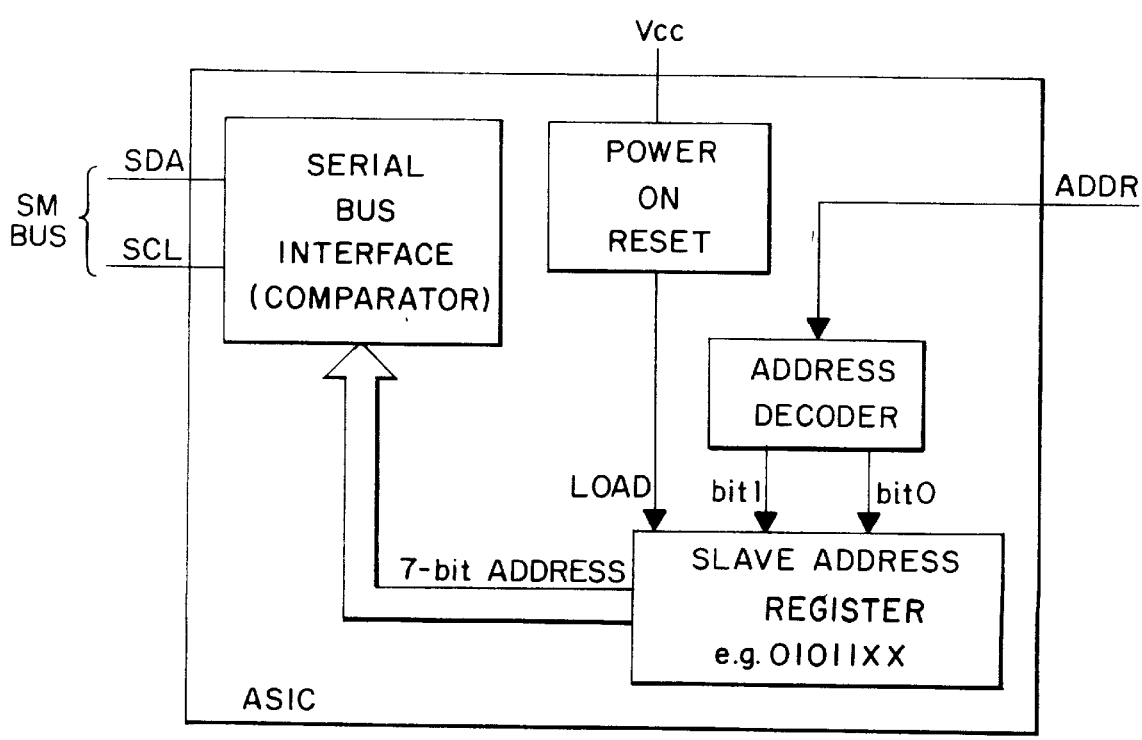
FIG. 2 is a block diagram of an exemplary one of the plurality of addressable integrated circuits and an address select circuit of FIG. 1.
Figure 3:
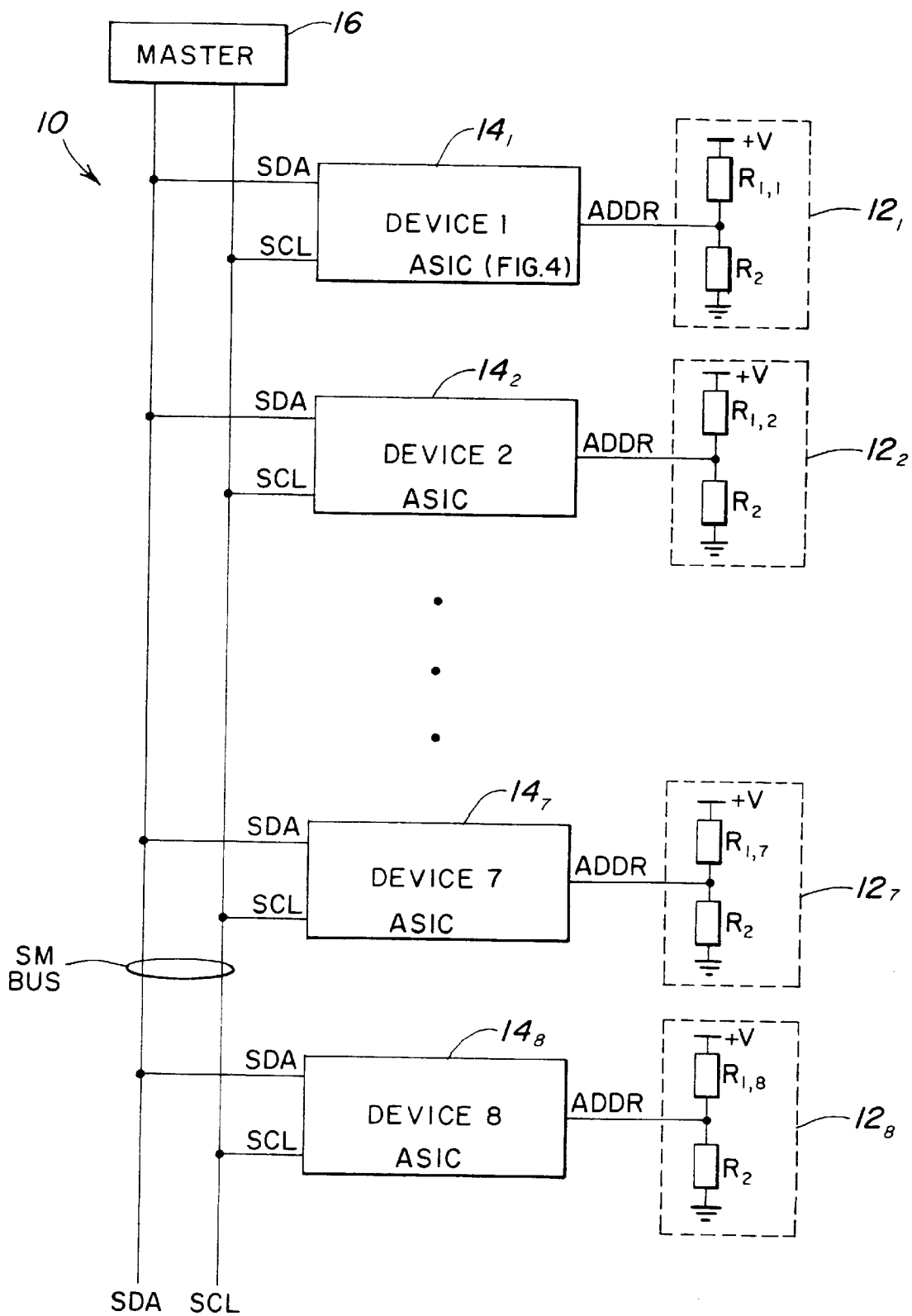
FIG. 3 is system having a plurality of interconnected addressable integrated circuits together with circuitry for providing a selected one of a plurality of addresses for a corresponding one of the integrated circuits during an address select mode in accordance with the invention.

Referring now to FIG. 3, a system 10 is shown having a plurality of, here, for example, eight address select circuits $12_1$–$12_8$, each one thereof being coupled to a corresponding one of a corresponding plurality of addressable integrated circuits, here ASICs $14_1$–$14_8$, respectively as shown through an SM bus, as indicated. Also included in the system 10 is a master unit 16 which provides address and data sequentially on line SDA to the ASICs $14_1$–$14_8$ along with clock pulses on line SCL. Each one of such integrated circuits $14_1$–$14_8$ has an address select pin ADDR adapted to receive a signal from the corresponding one of the address select circuits $12_1$–$12_8$, respectively. The signal at the pin ADDR is indicative of an address for such one of the plurality of addressable integrated circuits $14_1$–$14_8$.

It is noted that here each one of the address select circuits $12_1$–$12_8$ is a resistor divider network having a pair of resistors, $R_{1,1}$ and $R_2$ through $R_{1,8}$ and $R_2$, respectively, serially connected between a signal source, here a reference voltage, here +V and ground potential. Here, for example, the resistance of resistor $R_2$ is the same for each of the address select circuits $12_1$–$12_8$; however, the resistance of each of the resistors $R_{1,1}$ through $R_{1,8}$ are different for each of the address select circuits $12_1$–$12_8$, respectively. Thus, a different voltage level is produced by the address select circuits $12_1$–$12_8$ at each of the ADDR pins of the ASICs $14_1$–$14_8$, respectively. It should be understood that other relationships may be used for the resistors in the resistor divider network, for example a network where both resistors $R_{1,1}$–$R_{1,8}$ and $R_2$ change for each of the address select circuits $12_1$–$12_8$.

As will become more readily apparent, each one of the address decoders $12_1$–$12_8$ as will be used for coding the signal source, here the +V voltage, into a corresponding signal, here voltage, at the ADDR pin of the ASICs $14_1$–$14_8$, more particularly into a unique fractional voltage of the voltage provided by the +V voltage signal source. Thus, the voltage at ADDR pin of each of the ASICs $14_1$–$14_8$ is different one from the other. As will be seen, the voltage at the ADDR pin of any one of the ASICs $12_1$–$12_8$ is representative of the address for such one of the ASICs $14_1$–$14_8$, respectively. Further, as will be seen, the voltage at the ADDR pin may have one of more than three different voltage levels. Thus, more than three different addresses may be used for the ASICs $14_1$–$14_8$. That is the particular voltage level at ADDR pin is a signal having a selected one of more than three predetermined signal levels, here one of eight different voltage levels. Here for example, the voltage levels at the ADDR pins of the ASICs $14_1$–$14_8$ are 5V/16, 6V/16, 7V/16, 8V/16, 9V/16, 10V/16, 11V/16, and 12V/16, respectively. Thus, resistors $R_{1,1}$–$R_{1,7}$ are here, in this example, $2.2R_2$, $1.66R_2$, $1.285R_2$, $R_2$, $0.777R_2$, $0.6R_2$, $0.45R_2$, and $0.33R_2$, respectively.

Figure 4:
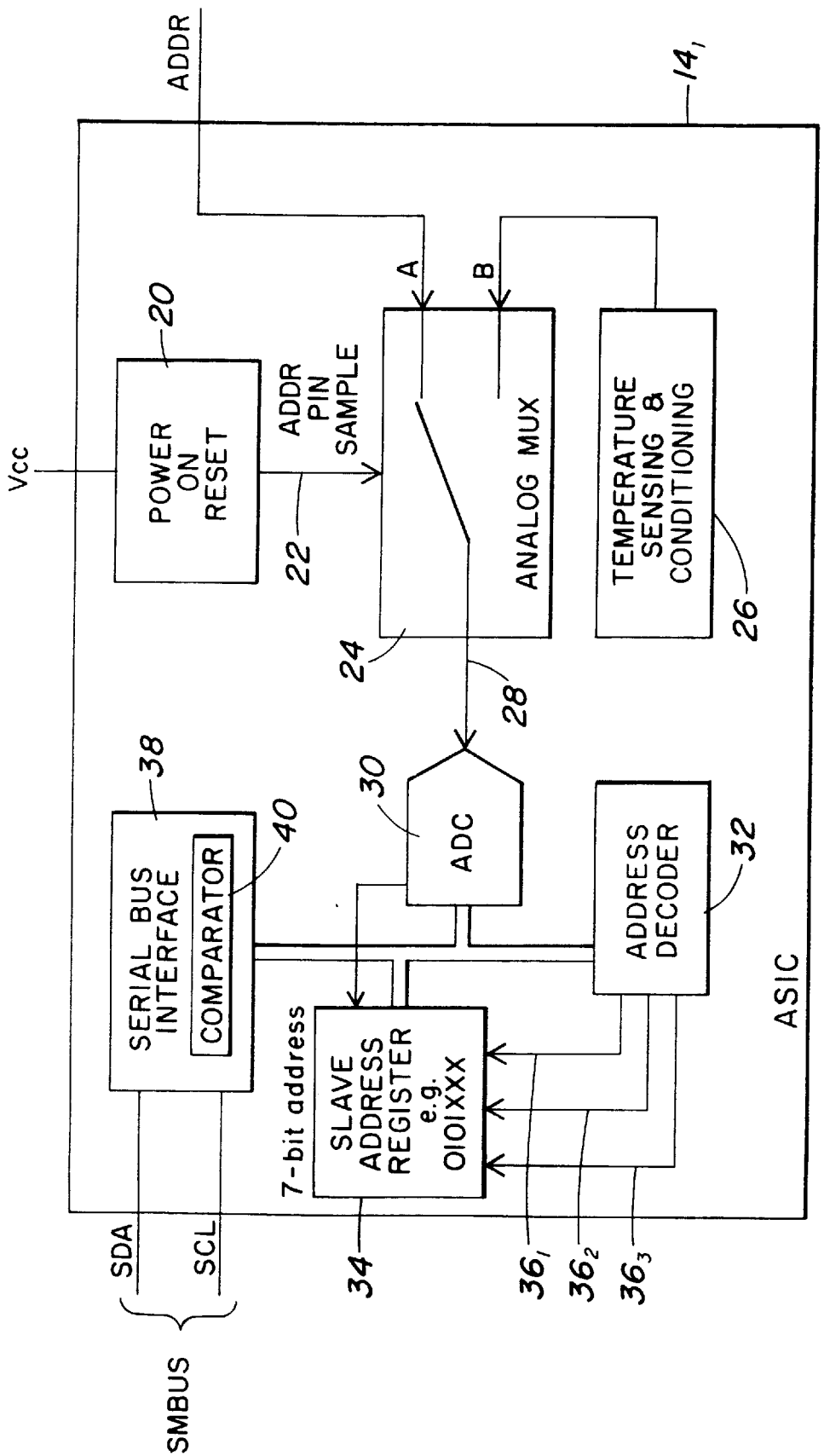
FIG. 4 is a block diagram of an exemplary one of the plurality of addressable integrated circuits and an address select circuit of FIG. 3.

Referring now also to FIG. 4, an exemplary one of the plurality of the ASICs $14_1$–$14_8$, here ASIC $14_1$, is shown in more detail to include a power-on reset unit 20 which produces, for example, a logic 1 on line 22 when the ASIC $14_1$, is turned on. Line 22 is fed to the control input of an analog multiplexer 24. The analog multiplexer 24 here is shown with two input ports, A and B. It is understood that more the multiplexer 24 may have more than two input ports, but that one of the ports, here port A, is connected to the ADDR pin, as shown. The other port, i.e., port B is coupled to a temperature sensing and signal conditioning circuit 26. At power-on, the port A is coupled to the output 28 of the multiplexer; after power-on. i.e., during the normal operating mode, port B is coupled to output port 28.

Also included in the ASIC $14_1$ is a converter 30, here an analog to digital converter. The converter 30 has the input thereof connected to output port 28, as indicated. The converter 30 is used during the power-on mode (i.e., when the signal fed to the converter through the multiplexer 24 is the voltage level at the ADDR pin. The converter, 30 during the power-on mode (i.e, during this initial address select mode) thus converts the signal level on the ADDR pin into a corresponding digital word, here a 8 bit digital word. The eight bit digital word is fed to a an address decoder 32. The decoder 32, for example, produces a three bit word on lines $36_1$–$36_3$ for a slave address register 34 in accordance with the following Table:

| Voltage at ADDR Pin | Converter 30 Output | Line $36_1$ | Line $36_2$ | Line $36_3$ |
|---|---|---|---|---|
| 5V/16 | 01010000 | 0 | 0 | 0 |
| 6V/16 | 01100000 | 0 | 0 | 1 |
| 7V/16 | 01110000 | 0 | 1 | 0 |
| 8V/16 | 10000000 | 0 | 1 | 1 |
| 9V/16 | 10010000 | 1 | 0 | 0 |
| 10V/16 | 10100000 | 1 | 0 | 1 |
| 11V/16 | 10110000 | 1 | 1 | 0 |
| 12V/16 | 11000000 | 1 | 1 | 1 |

After completion of the conversion process by the converter 30, the three bits on lines $36_1$–$36_3$ become stored as the three least significant bits of a seven bit word stored in the register 34, the four most significant bits in the register 34 having been previously stored therein.

The ASIC 14₁, also has a serial bus interface 38 coupled to the SDA and SCL lines of the SM Bus. The serial interface also includes a comparator 40.

After power-on, and during the normal operating mode, the logic signal on line 22 from the power-on reset 20 changes to a logic 0, for example, thereby coupling the temperature sensing and conditioning circuit 26 to the converter 30 for use by the ASIC 14₁. Further, during normal operation, addresses on the SM Bus are compared in comparator 40 with the seven bit address stored in the address register 34 for determining whether ASIC 14₁, is the one of the ASIC 14₁–14₈ which has been addressed by the master 16 (FIG. 3).

Other embodiments are within the spirit and scope of the appended claims. For example, other voltage values may be used for the ADDR pins, other decoder schemes may be used for the address decoder 32. For example, the decoder 32 may be eliminated and the three most significant bits, or other bits, of the digital word produced by the converter 30 may be stored as the three least significant bits of the address register 30. Further, more than three bits may be produced at the output of the address decoder 32 for storage in the slave address register 34. Still further, other than seven bits may be used for the address. Still further, other bus schemes may be used.

What is claimed is:

1. An address select circuit for an addressable integrated circuit, comprising:
   a signal source; and
   a circuit for coding such signal source into a corresponding signal at a pin of the integrated circuit, such signal having a selected one of more than three predetermined signal levels; and
   wherein such integrated circuit includes:
      a converter, having an input adapted for coupling to the pin, for converting the selected one of the signal levels into a address signal for such integrated circuit; and
      a register for storing the address signal for such integrated circuit.

2. An address select circuit for providing an address for an integrated circuit, comprising:
   a signal source; and
   a circuit for coding such signal source into a corresponding signal at a pin of the integrated circuit, such signal having a selected one of more than three predetermined signal levels; and
   wherein such integrated circuit includes:
      a converter for converting such selected one of the signal levels into a address signal for such integrated circuit during an initial address select mode and for providing conversion of a second signal in the integrated circuit for use by such integrated circuit in processing the second signal during a subsequent normal operating mode.

3. The circuit recited in claim 2 wherein the converter is an analog to digital converter.

4. The circuit recited in claim 3 wherein the second signal is indicative of temperature.

5. A system comprising:
   a plurality of address select circuits, each one thereof being coupled to a corresponding one of a corresponding plurality of addressable integrated circuit, each one of such integrated circuits having an address select pin adapted to receive an address select signal from the corresponding one of the address select circuits, such address select signal being indicative of an address for such one of the plurality of addressable integrated circuits, each one of such address circuit, comprising:
   a signal source; and
   a circuit for coding such signal source into a corresponding signal at a pin of the integrated circuit, such signal having a selected one of more than three predetermined signal levels; and
   wherein such integrated circuit includes:
      a converter for converting such selected one of the signal levels into a address signal for such one of the integrated circuits; and
      a register for storing the address signal for such one of the integrated circuits.

6. A system comprising:
   a plurality of address select circuits, each one thereof being coupled to a corresponding one of a corresponding plurality of addressable integrated circuit, each one of such integrated circuits having an address select pin adapted to receive a signal from the corresponding one of the address select circuits, such signal being indicative of an address for such one of the plurality of addressable integrated circuits, each one of such address circuit, comprising:
   a signal source; and
   a circuit for coding such signal source into a corresponding signal at a pin of the integrated circuit, such signal having a selected one of more than three predetermined signal levels; and
   wherein such integrated circuit includes:
      a converter for converting such selected one of the signal levels into a address signal for such one of the integrated circuits during an initial address select mode and for providing conversion of a second signal in the integrated circuit for use by such integrated circuit in processing the second signal during a subsequent normal operating mode.

7. The system recited in claim 6 wherein the converter is an analog to digital converter.

8. The system recited in claim 7 wherein the second signal is indicative of temperature.

9. A method for providing an address for an addressable integrated circuit, comprising:
   providing a signal source; and
   coding such signal source into a corresponding signal at a pin of the integrated circuit, such signal being coded with a selected one of more than three predetermined signal levels;
   converting the selected one of the signal levels into a address signal for such integrated circuit; and
   storing the address signal for such integrated circuit.

10. A method for providing an address for an integrated circuit, comprising:
   providing a signal source;
   coding such signal source into a corresponding signal at a pin of the integrated circuit, such signal being coded with a selected one of more than three predetermined signal levels; and
   converting such selected one of the signal levels into a address signal for such integrated circuit during an initial address select mode and conversing a second signal in the integrated circuit for use by such integrated circuit in processing the second signal during a subsequent normal operating mode.

11. The method recited in claim 10 wherein the converting comprises providing an analog to digital converter to provide the conversion.

12. The method recited in claim 11 wherein the second signal is provided to indicate of temperature.

13. A method, comprising:

provinding a plurality of address select circuits, each one thereof being coupled to a corresponding one of a corresponding plurality of addressable integrated circuit, each one of such integrated circuits having an address select pin adapted to receive an address select signal from the corresponding one of the address select circuits, such address select signal being indicative of an address for such one of the plurality of addressable integrated circuits;

providing a signal source;

coding such signal source into a corresponding signal at a pin of the integrated circuit, such signal being coded with a selected one of more than three predetermined signal levels;

converting such selected one of the signal levels into a address signal for such one of the integrated circuits; and storing the address signal for such one of the integrated circuits.

14. A method, comprising:

providing a plurality of address select circuits, each one thereof being coupled to a corresponding one of a corresponding plurality of addressable integrated circuit, each one of such integrated circuits having an address select pin adapted to receive a signal from the corresponding one of the address select circuits, such signal being indicative of an address for such one of the plurality of addressable integrated circuits;

providing a signal source;

coding such signal source into a corresponding signal at a pin of the integrated circuit, such signal having a selected one of more than three predetermined signal levels;

converting such selected one of the signal levels into a address signal for such one of the integrated circuits during an initial address select mode and for converting a second signal in the integrated circuit for use by such integrated circuit in processing the second signal during a subsequent normal operating mode.

* * * * *